310-800 SR

PWE40 XR 3,912,830

United States Patent [19]

Murayama et al.

[11] 3,912,830

[45] Oct. 14, 1975

[54] METHOD OF PRODUCING A PIEZOELECTRIC OR PYROELECTRIC ELEMENT

[75] Inventors: Naohiro Murayama; Takao Oikawa, both of Iwaki, Japan

[73] Assignee: Kureha Kagaku Kogyo K.K., Nihonbashi, Japan

[22] Filed: Jan. 18, 1974

[21] Appl. No.: 434,732

Related U.S. Application Data

[62] Division of Ser. No. 296,490, Oct. 10, 1972, abandoned.

[30] Foreign Application Priority Data

Oct. 13, 1971 Japan ............................... 46-80184

[52] U.S. Cl. ................ 427/100; 427/122; 427/124; 427/123

[51] Int. Cl.² ........................................... B44D 1/18

[58] Field of Search .. 117/217, 218, 107, 138.8 UF, 117/216, 226, 106 R

[56] References Cited

UNITED STATES PATENTS

| | | | |
|---|---|---|---|
| 1,692,074 | 11/1928 | Burtis | 117/217 |
| 2,648,785 | 8/1953 | Tournier | 310/9 |
| 2,809,130 | 10/1957 | Rappaport | 117/138.8 UF |
| 2,898,228 | 8/1959 | Kelley | 117/107 |
| 2,923,651 | 2/1960 | Petriello | 117/138.8 UF |
| 2,930,714 | 3/1960 | Netherwood | 117/138.8 UF |
| 3,030,290 | 4/1962 | Ryan, Jr. | 117/138.8 UF |
| 3,133,854 | 5/1964 | Simms | 117/138.8 UF |
| 3,201,271 | 8/1965 | Simmons, Jr. et al. | 117/107 |

OTHER PUBLICATIONS

Fukada et al. *Piezoelectric Effect in Polarized Poly(-vinylidene fluoride)*, In Chemical Abstracts, 71:81848, 1969.

Kawai, H. *Piezoelectricity of poly(vinylidene fluoride)*, In Chemical Abstracts, 71:81983, 1969.

Nakamura et al. *Piezoelectricity, Pyroelectricity, and the Electrostriction Constant of Poly(vinylidene Fluoride)*, In Journal of Polymer Science: Part A–2 9: p. 161–173, Jan. 1971.

Cohen et al. *Piezoelectric Effect in Oriented Polyvinylchloride and Polyvinylflouride*, In Journal of Applied Physics, 42(8): p. 3072 – 3074, July, 1971.

*Primary Examiner*—Cameron K. Weiffenbach
*Attorney, Agent, or Firm*—Sughrue, Rothwell, Mion, Zinn & Macpeak

[57] ABSTRACT

A piezoelectric and/or pyroelectric element having improved durability is composed of a piezoelectric or pyroelectric polymer film such as a polyvinylidene fluoride film, an under coating of a thermoplastic or thermosetting resin having negligible piezoelectricity or pyroelectricity applied on the surface of a polar fluorinated polymer film, and metal electrodes vacuum-deposited on the surface of the under coating. The piezoelectric or pyroelectric element is produced by preparing the above-indicated structure using a polar fluorinated polymer film which has not yet been provided with piezoelectricity or pyroelectricity and conducting the polarization of a polar fluorinated polymer film using the metal electrodes as the polarization electrodes.

6 Claims, 1 Drawing Figure

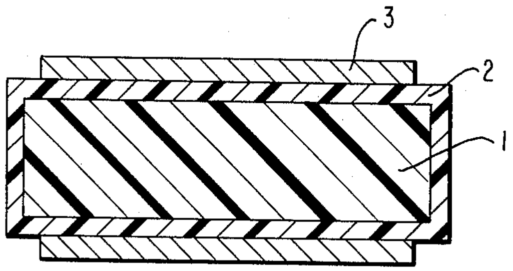
3
2
1

METHOD OF PRODUCING A PIEZOELECTRIC OR PYROELECTRIC ELEMENT

This is a division of application Ser. No. 296,490 , filed Oct. 10, 1972 , and now abandoned.

BACKGROUND OF THE INVENTION

1 . Field of the Invention

The present invention relates to a polymer-type piezoelectric and/or pyroelectric energy conversion element having vacuum-deposited metal electrodes and a method of producing such an element.

2 . Description of the Prior Art

It is know that a polar fluorinated polymer, such as polyvinylidene fluoride, a polyvinylidene fluoride copolymer, polyvinyl fluoride, etc., show, when subjected to a polarization treatment, high piezoelectricity and/or pyroelectricity. Such a piezoelectric or pyroelectric material is, after equipped with electrodes, used as a piezoelectric element or pyroelectric element. Such an electrode is required to have (1) good electric conductivity, (2) a quite thin thickness, (3) excellent humidity resistance, and (4) excellent adhesive strength to the piezoelectric or pyroelectric material to such an extent that it will not be stripped off by contact with foreign matter. In particular, the electrode for a piezoelectric element is further required to have (5) a light weight and (5) good durability to severe vibration for long periods of time, which have never been observed in conventional piezoelectric elements.

It has previously been found that the properties (1) to (5) of the electrode may be satisfied by vacuum-depositing, spattering, or plating a metal such as palladium, gold, silver, nickel, zinc, aluminum, etc., or a mixture of two or more such metals.

However, a piezoelectric element or pyroelectric element is inevitably brought into contact with foreign matter when the element is set in a system and further, the element encounters inevitably some vibrations at the handling thereof when such an element is composed of a polymer film having a thin thickness and a wide area which are the characteristics of the polymeric material. In particular, the piezoelectric element is always accompanied by mechanical vibrations owing the deformation of the element itself. Therefore, the piezoelectric is required to have good durability; that is, it is required to satisfy the aforesaid condition (6) and in this regard, the adhesive strength of the electrodes and piezoelectric film in conventional piezoelectric elements is not staisfactory.

A polar fluorinated polymer film exhibits, when subjected to a polarization treatment, high peizoelectricity or pyroelectricity; however, the adhesivity between the film and a metal layer is generally poor. For example, when aluminum is vacuum-deposited on the surface of a polyvinylidene fluoride film, only unstable electrodes are obtained on the surface of the film. Alternatively, the electrodes thus formed on the polymer film generally have such faults that they readily come off when rubbed by a finger and they cannot endure vibrations of a long period of time.

For overcoming these faults, the surface treatment of the polymer film by corona discharging or by organic or inorganic compounds has beenn proposed but the adhesivity of the film improved by such a surface treatment is not yet sufficient in some cases the durability potential of the film will be reduced by such a surface treatment. For example, when a polarization treatment of a polyvinylidene fluoride film having metal electrodes formed on the surface treated surfaces thereof is required, it is difficult to apply a high electric potential between the electrodes on both surfaces of the polymer film, which makes it difficult to provide a piezoelectric or pyroelectric element having excellent properties.

SUMMARY OF THE INVENTION

An object of the present invention is, therefore, to provide a polymer-type piezoelectric or pyroelectric element having electrodes strongly adhered to the surfaces of the element.

Another object of this invention is to provide a method of producing the improved polymer-type piezoelectric or pyroelectric element described above.

BRIEF DESCRIPTION OF THE DRAWING

The figure of the accompanying drawing is a schematic cross sectional view showing an embodiment of the piezoelectric or pyroelectric element of this invention.

DESCRIPTION OF THE PREFERRED EMBODIMENTS

The inventors have discovered that a piezoelectric or pyroelectric element having excellent durability can be produced without substantially changing or reducing the piezoelectricity or pyroelectricity by coating the surface of a polar fluorinated polymer film having piezoelectricity or capable of being provided with piezoelectricity (hereinafter, those polymer films are called "piezoelectric films") or a polar fluorinated polymer film having pyroelectricity or capable of being provided with pyroelectricity (hereinafter, those polymer films are called "polyroelectric films") with a high molecular weight compound having good adhesivity to the above piezoelectric film or pyroelectric film, and then forming thereon electrodes of a conductive material by vacuum-depositing or plating thereon the conductive material.

The piezoelectric and/or pyroelectric element of this invention will be explained by referring to the accompanying drawing, in which a polymer film 1 having high piezoelectricity or pyroelectricity, such as a piezoelectric or pyroelectric or pyroelectric polyvinylidene fluoride film, has a thin polymer film 2 having negligible piezoelectricity or pyroelectricity, such as an acrylic resin film or an epoxy resin film coated on the surface of the polymer film 1 and has further a layer of a conductive material 3, such as a metal or carbon formed on the thin film 2 by vacuum-deposition or plating.

The high molecular weight compound to be coated on the surface of the polar fluorinated polymer film or the piezoelectric or pyroelectric film is required to show better adhesivity to the conductive material to be used as the electrode than the piezoelectric or pyroelectric film and futher, better adhesivity to the piezoelectric or pyroelectric film than the conductive material as well as exhibiting negligible piezoelectricity or pyroelectricity. Furthermore, in the case of conducting a polarization treatment after forming electrodes on the polymer film by vacuum-depositing (including spattering) or plating in the production of the piezoelectric or pyroelectric element, the high molecular weight compound is further requied not to be provided with piezoelectricity or pyroelectricity by such polarization operation.

Such high molecular weight compounds include thermosetting resins and thermoplastic resins. The practical examples of such high molecular weight compounds are an epoxy resin, an acrylic resin, a chloroprene resin, a dichlorobutadiene resin, a phenol resin, a vinyl acetate resin, and the like. In addition, the term "a polymer or a high molecular weight compound having negligible piezoelectricity or pyroelectricity or capable of being provided with negligible piezoelectricity or pyroelectricity" is a polymer having, if any, extremely low piezoelectricity or pyroelectricity (preferably less than one-tenth) as compared with that of the piezoelectric or pyroelectric film such that the piezoelectricity or pyroelectricity can be disregarded as compared with that of the piezoelectric or pyroelectric polar fluorinated polymer film. Accordingly, when the piezoelectric film or the pyroelectric film is a polymer film having a high piezoelectricity or pyroelectricity prepared by highly polarizing a stretched or oriented polyvinylidene fluoride film, etc., a high molecular weight compound, such as a polymethyl methacrylate, which can be provided with low piezoelectricity or pyroelectricity by the polarization treatment can be used.

The high molecular weight compound may be coated on the piezoelectric or pyroelectric film by a desired manner in this invention, such as, for example, by directly applying the high molecular weight compound after melting to the film, by immersing the piezoelectric film or the pyroelectric film in the solution or organosol of the high molecular weight compound, and by applying or spraying the solution of the organosol of the high molecular weight compound onto the surface of the piezoelectric or pyroelectric film. The thickness of the coating of the high molecular weight compound is ordinarily about 0.1 – 20 microns. In case of the thin piezoelectric element, it is desirable that the thickness of the coating of the high molecular weight compound to be coated on the piezoelectric film be as thin as possible in a permissible range when considering the stress loss resulting from coating and the influence on the dielectric constant and the Young's modulus, although the thickness thereof may be changed properly according to the thickness of the piezoelectric film, the properties of the polymer to be coated, and the like. Moreover, in case of the pyroelectric element, it is also desirable that the thickness of the high molecular weight compound be as thin as possible for increasing the heat conductivity between the electrodes and the pyroelectric film to quicken the response of the element, and prevent the occurrence of electric loss by the dielectric constant of the coating.

The piezoelectric or pyroelectric element of this invention is preferably produced by coating both surfaces of the polymer film with the high molecular weight compound prior to the polarization treatment, forming on the coatings electrodes of a conductive material, such as a metal or carbon by means of vacuum-deposition or plating, and then subjecting the assembly to a polarization treatment using the conductive layers as the polarization electrodes. This is so because when the electrodes are formed on the coating of a piezoelectric or pyroelectric polymer film provided with the piezoelectricity or pyroelectricity by applying a polarization treatment by vacuum-deposition or plating, the internal polarization of the polymer film is destroyed by the high temperature or electric current at the formation of the electrodes to reduce the piezoelectricity or pyroelectricity. Therefore, it is preferable to conduct the polarization treatment after forming the electrodes on the coatings of the polymer film. In addition, in the case of using a stretched polymer film, such as a polyvinylidene fluoride film, the coating of the high molecular weight compound and the formation of the electrodes are usually conducted after stretching the polymer film, but the stretching of the polymer film may be conducted after forming the polymer coatings and electrodes on the polymer film.

Now the invention will be described by referring to the following example, which is simply illustrative and not limitative of the present invention.

EXAMPLE

A uniaxially stretched polyvinylidene fluoride film having a thickness of about 56 microns was immersed in a 1 percent chloroform-acetone (5:5) solution of Epon No. 828 (an epoxy resin produced by the Shell Chemical Corp.) and Versamid 115 (a curing agent produced by the Dai-ichi General K.K. Co.) in a ratio of 4:6 and dried at room termperature to provide the undercoated film of 62 microns in thickness. Thereafter, aluminum was vacuum-deposited on the undercoat under a reduced pressure of $10^{-5}$ mm.Hg. The thickness of the aluminum coated thus formed was about 700 A.

When a stripping test by means of adhesive tape was applied to the vacuum-coated aluminum coating, no stripping of the aluminum coating was observed. On the other hand, when aluminum was vacuum-deposited on the surface of the polyvinylidene fluoride film directly or after subjecting the surface thereof to corona discharging, the aluminum coating was readily stripped off by the stripping test with the adhesive tape.

Each of the three kinds of the coated films prepared above were subjected to a polarization treatment using the aluminum coatings as the electrodes at 90°C. while applying a D.C. potential of 700 KV/cm. The piezoelectric constant of the piezoelectric elements obtained was $7.1 \times 10^{-7}$ cgs. esu. In each case, that is, the piezoelectric element of this invention having the under coat was not inferior in the piezoelectricity to those having no under coat.

When the piezoelectric element of this invention prepared above was used as a piezoelectric element for a pick up for a record player and the pick up was used for record playing for longer than 1,000 hours, no deterioration in sound and shape was observed. On the other hand, when the comparison piezoelectric element having no undercoat was used, the sensitivity thereof was reduced within a few tens of hours and when it was used for 100 hours, the aluminum coating was totally stripped off.

Although the present invention has been adequately described in the foregoing specification and example included therein, it is readily apparent that various changes and modifications can be made without departing from the spirit and scope thereof.

What is claimed is:

1. A method for producing a piezoelectric or pyroelectric element which comprises:

a. coating the surface of a polar fluorinated polymer film capable of being provided with piezoelectricity and pyroelectricity by a polarization treatment with a high molecular weight thermosetting or thermoplastic resin capable of being provided negligible piezoelectricity or pyroelectricity by polarization treatment, b. forming on the coating of said high molecular weight resin thin electrodes of a conductive material selected from the group consisting of metal and carbon by vacuum-coating and c. subjecting the polymer film to a polarization treatment using the coatings of the conductive material as the polarization electrodes.

2. The method of claim 1, wherein said polymer film is a stretched polyvinylidene fluoride film.

3. The method of claim 1 wherein said conductive material is a metal.

4. A method for producing a piezoelectric or pyroelectric element which comprises:

a. coating the surface of a polar fluorinated polymer film capable of being provided with peizoelectricity and pyroelectricity by a polarization treatment with a high molecular weight thermosetting or thermoplastic resin capable of being provided with negligible piezoelectricity or pyroelectricity by polarization treatment, b. forming on the coating of said high molecular weight resin thin electrodes of a conductive material selected from the group consisting of metal and carbon by plating, and c. subjecting the polymer film to a polarization treatment using the coatings of the conductive material as the polarization electrodes.

5. The method of claim 4 wherein said polymer film is a stretched polyvinylidene fluoride film.

6. The method of claim 4 wherein said conductive material is a metal.

* * * * *